United States Patent [19]
Schantz et al.

[11] Patent Number: 5,572,869
[45] Date of Patent: Nov. 12, 1996

[54] ACTUATOR ASSEMBLY FOR USE IN APPLIANCES

[75] Inventors: Spencer C. Schantz, Dousman; Steve L. Sagar, Muskego, both of Wis.; Kenyon A. Hapke, Libertyville, Ill.; William E. Bargholtz, Palmyra, Wis.

[73] Assignee: U. S. Controls Corporation, New Berlin, Wis.

[21] Appl. No.: 346,969

[22] Filed: Nov. 30, 1994

[51] Int. Cl.⁶ .................................................. F03G 7/06
[52] U.S. Cl. ................................................ 60/528
[58] Field of Search .......................... 60/516, 527, 528

[56]  References Cited

U.S. PATENT DOCUMENTS

| | | | |
|---|---|---|---|
| 2,368,181 | 1/1945 | Vernet | 60/527 |
| 3,045,918 | 7/1962 | Woods | 236/34 |
| 3,046,787 | 7/1962 | Wagner | 60/527 |
| 3,075,348 | 1/1963 | Baker | 60/528 |
| 3,166,892 | 1/1965 | Sherwood | 60/527 |
| 3,166,893 | 1/1965 | Sherwood | 60/527 |
| 3,308,668 | 3/1967 | Wong | 60/527 |
| 3,335,997 | 8/1967 | Sherwood | 251/11 |
| 3,376,631 | 4/1968 | Sherwood et al. | 29/405 |
| 3,381,701 | 5/1968 | Sherwood et al. | 137/339 |
| 3,403,559 | 10/1968 | Janous | 60/527 |
| 3,420,105 | 1/1969 | Winter | 60/527 |
| 3,472,478 | 10/1969 | Sherwood | 251/11 |
| 3,505,809 | 4/1970 | Sherwood | 60/527 |
| 3,719,322 | 3/1973 | Gifford | 236/102 |
| 3,833,171 | 9/1974 | Gifford | 236/102 |
| 4,095,470 | 6/1978 | Sliger | 60/527 |
| 4,207,767 | 6/1980 | Schmucki | 60/527 |
| 4,441,317 | 4/1984 | Wolfe et al. | 60/527 |
| 4,453,668 | 6/1984 | Abel | 236/34.5 |
| 4,691,516 | 9/1987 | Fornasari | 60/527 |
| 4,739,297 | 4/1988 | Fornasari | 337/120 |
| 4,753,271 | 6/1988 | Fornasari | 137/625.43 |
| 4,776,559 | 10/1988 | Fornasari | 251/11 |
| 5,419,133 | 5/1995 | Schneider | 60/527 |

FOREIGN PATENT DOCUMENTS

| | | | |
|---|---|---|---|
| 917122 | 12/1972 | Canada . | |
| 2625561 | 2/1980 | Germany | H05B 1/02 |
| 374046 | 5/1932 | United Kingdom . | |
| 878832 | 4/1961 | United Kingdom . | |
| 2171463 | 9/1988 | United Kingdom | F03G 7/06 |

OTHER PUBLICATIONS

Brochure, "Wax Thermostatic Elements", Vernet.
Brochure "Caltherm", Thermostats for Temperature and Flow Control.

*Primary Examiner*—Leonard E. Heyman
*Attorney, Agent, or Firm*—Quarles & Brady

[57]  ABSTRACT

A casing (11, 12) holds an actuator (18) having a stem (21) that is moves a plunger with substantial force in response to the actuator (18) being heated. The movement of the plunger (22) loads a compression spring (23) that is located between a base end of the plunger (22) and an opposing end wall of the casing. Two longitudinal casing sections (11, 12) form arcuate projections (43, 44) on the opposing end wall (49) which are inserted within at least one coil of the spring with an interference fit to hold the casing half sections together. Beams (64, 65, 74, 75) adjacent the base end wall (17) add support against the thrust reaction movement of the actuator housing (18) in response to movement of the plunger (22) against the compression spring (23).

26 Claims, 5 Drawing Sheets

ACTUATOR ASSEMBLY FOR USE IN APPLIANCES

TECHNICAL FIELD

The invention relates to actuator assemblies of the type used in household appliances, such as washing machines and dishwashers.

BACKGROUND ART

Actuator assemblies have been known for dispensing soap and other materials in washing machines and dishwashers. In the case of dishwashers, a soap dispenser in the door is operated by electrical control of a resistive heater to heat a thermally responsive actuator.

Actuators of the type which utilize wax, or another thermally expansible material are disclosed in U.S. Pat. Nos. 2,368,181 and 4,441,317.

Such actuators develop large forces over a short stroke distance such as one-quarter inch. When used in an actuator assembly, there is a technical problem in restraining the actuator and reaction devices, such as a plunger return spring, located within the actuator casing. Typically, these casings are made of polyester or another synthetic material.

In one prior known device, the actuator is held inside two casing sections, but due to the forces developed within the housing and a relatively stiff return spring, undue stress may be placed on the connectors which are used to hold the two casing sections together. This can occur in assembly or after a number of operating cycles, which are typically accompanied by moderate to strong vibrations.

It is one object of the present invention to improve on prior casing designs, so the resulting item is easy to assemble in manufacturing, and its connecting members are not subjected to forces during assembly and operation which would cause the casing sections to separate.

DISCLOSURE OF THE INVENTION

The invention relates to a casing for an actuator assembly which, in the example given herein, is applied to a soap dispenser in a dishwasher.

The invention provides an assembly in which a return spring, which is relatively stiff, and which stores considerable return force and energy, is utilized to hold to casing sections together. The casing sections form arcuate projections which fit closely inside the end coils of the return spring, to hold the casing sections together.

The two casing sections also form beams adjacent the base end wall for supporting the one end of the actuator against the force of a plunger return spring acting on the other end of the actuator.

The casing sections are identical, and when one is turned over for assembly to the other, it provides complementary parts which fit into other parts on the other casing section. This arrangement provides for greater economy in design, manufacture and assembly.

It is a further object of the invention to increase the reliability of the device. Terminals are provided with reinforced portions to help prevent bowing of the housing sections. Each terminal also has bifurcated contacts to improve current flow and maintain the electrical connection if a fracture occurs in a resistive heating device or an ohmic layer on the device.

An improved seal has been devised to seal the wax motor element. Bulkhead sections are provided in the housing to further seal a resistor with ohmic layers from the sealed end of the wax motor element to prevent leakage from migrating to the resistor.

Other features involve a method of assembling the relatively stiff spring in the housing.

Other objects and advantages, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and, therefore, reference is made to the claims which follow the description for determining the scope of the invention.

DETAILED DESCRIPTION OF THE PREFERRED EMBODIMENT

Figure 1:
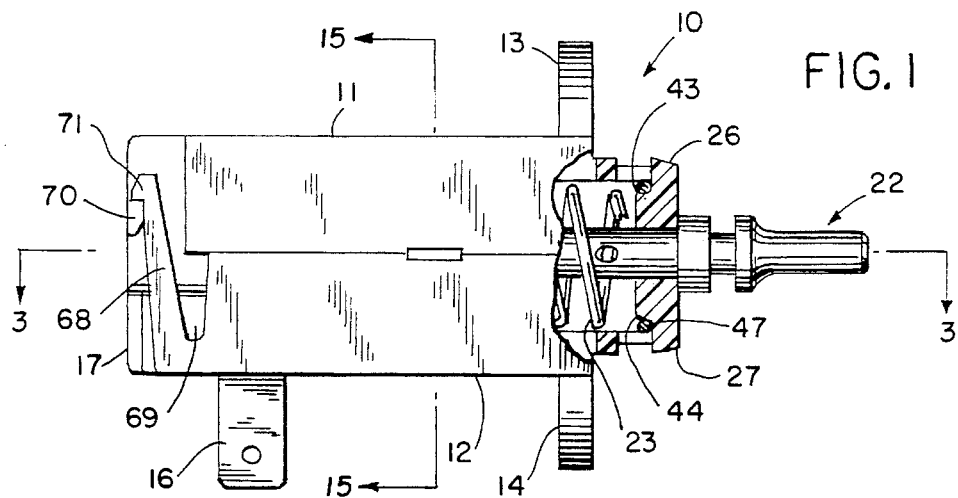
FIG. 1 is a right side view in elevation of an actuator assembly of the present invention.

FIG. 1 shows an actuator assembly 10 for a soap dispenser in a dishwasher. The assembly 10 includes a top casing half section 11 and a bottom casing half section 12. The casing sections 11, 12 extend longitudinally, which is from left to right as seen in FIG. 1. Apertured lugs 13, 14 (also seen in FIGS. 1, 4, 5 and 12) are integrally formed with casing sections 11, 12, near the front end, for attachment of the assembly 10 within a larger piece of apparatus. Contact blades 15, 16 on electrical terminals 201 extend downwardly near the rear or base end wall 17, for plugging the assembly 10 into a source of electrical energy. The casing sections 11, 12 are made of a synthetic polyester or polyimide material, such as Celanese 1503-2; Celanex 3310; Celanex 7700 or IMPET 530.

Figure 3:
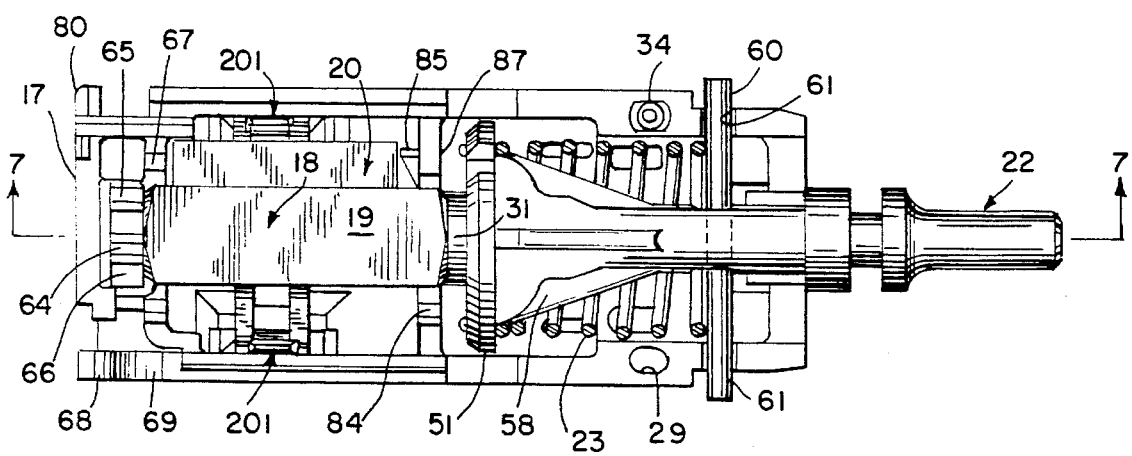
FIG. 3 ms sectional view of the assembly of FIG. 1 taken in the plane indicated by line 3—3 in FIG. 1.
Figure 4:
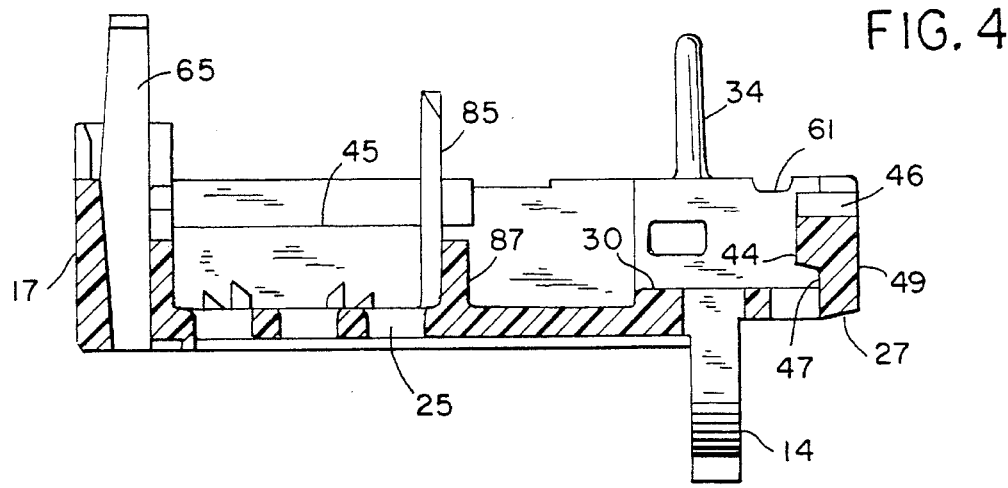
FIG. 4 is a sectional view taken in the plane indicated by line 4—4 in FIG. 2.
Figure 5:
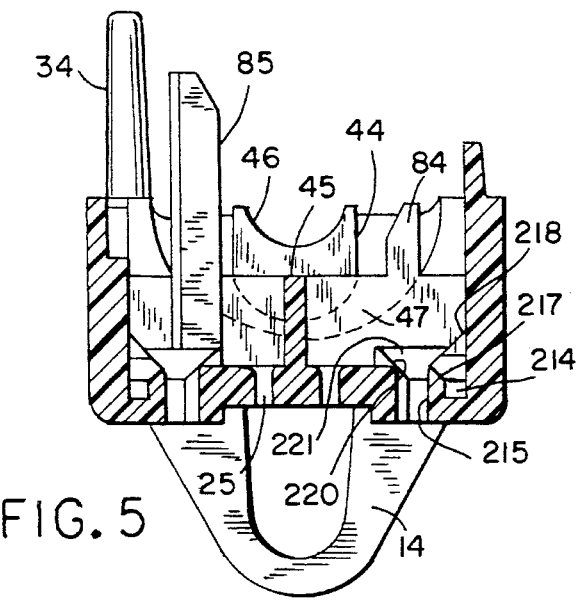
FIG. 5 is a sectional view taken in the plane indicated by line 5—5 in FIG. 2.
Figure 11:
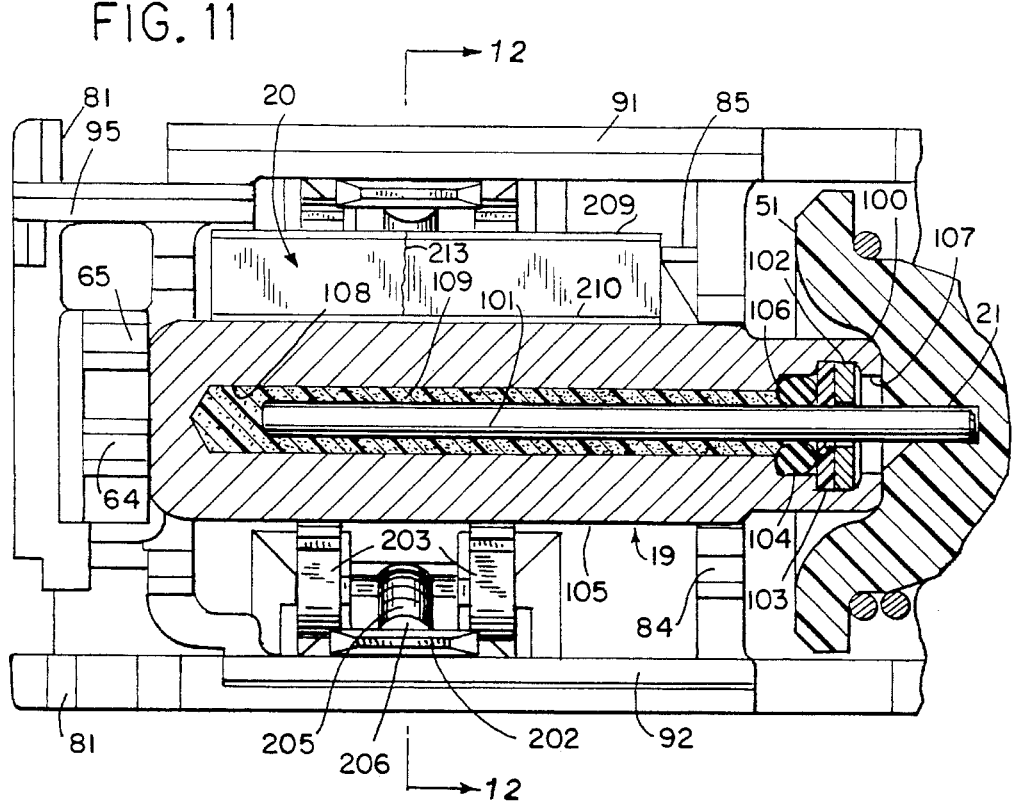
FIG. 11 is a top sectional view of the actuator seen in FIG. 3.

As seen in FIG. 3, a positive temperature coefficient (PTC) resistor 20 is mounted inside the housing sections 11, 12. The resistor 20 receives electrical current supplied through elements 15, 16 and heats up to apply heat to a thermally-responsive actuator 18. The thermally-responsive actuator 18, sometimes also referred to a wax motor element, is mounted inside the casing sections 11, 12. As seen in more detail in FIG. 11, the thermal actuator 18 has a metal housing 19. As seen in FIG. 11, the housing 19 has first counterbore 106 in which an O-ring 104 of temperature resistant material is positioned. A brass washer 102 and a washer 103 made of a fluorocarbon material, such as Teflon, are stacked in a second counterbore 107 of larger diameter than the first counterbore 106. The brass washer 102, being of softer material than the hardened shaft 101, is retained by a crimp in the housing 19. A hardened shaft 101, preferably of stainless steel, provides an operating stem portion 21 that extends out of the housing 19 through openings in the centers of O-ring 104, Teflon washer 103 and brass washer 102. The Teflon washer 103 is provided with an interference fit with shaft 101. A thermally expansive material 109, such as wax or another suitable material, is contained within a main cavity 108 in the housing.

Returning to FIGS. 3 and 12, the positive temperature coefficient (PTC) resistor 20 with ohmic layers 209, 210 is attached to one side of the thermal actuator housing 19 by one of several methods to be described. Current is supplied through terminals to resistor 20 to produce resistive heating. Heat is conducted to the housing 19 from resistor 20, and from there, is conducted to the material 109, causing it to expand and causing the free end 21 of rod 101 to move out from crimped end of the housing 100. O-ring 104 is sized relative to the counterbore 106, such that it is allowed to float in the manner of a hydraulic seal. The operating stem 21 is moved through an operating stroke of approximately ¼ inch.

Operating stem 21 (FIG. 7) has a tip that is received in a hole 52 in a base 51 of a plunger 22. The plunger 22 is made of one of the materials specified above for the casing sections 11, 12 and has a shaft end 50 that extends out of the casing sections 11, 12. This shaft end 50 is formed with a nose 57, and first and second annular flanges 54 and 56 are separated by an annular groove 55 for connection to apparatus controlling the soap dispenser door. Ribs 58 extend from the base up the sides of the plunger shaft 50. The ribs 58 extend along the inner diameter of the spring, for a portion of their length, to support the inner diameter of the spring 23 and prevent the spring 23 from buckling.

As seen in FIGS. 2, 4, 5, 10 and 12, the casing sections 11, 12 are formed with vents 24, 25 to vent heat from the casing 11, 12. The casing half sections 11, 12 also provide cowl half sections 26, 27 (FIGS. 1, 8, 9 and 10) which together form a cowl extending from one end of the casing.

The casing top section 11 has a connecting pin 28 (FIG. 9) extending down from a left side wall to be received in a slot 29 (FIGS. 2 and 3) in a left sidewall of the bottom section 12. On the right sidewall, a pin 34 extends up from the bottom section to be received in a slot (not shown) in the top section similar to slot 37. Inside the cowl sections 26, 27 are arcuate sections 43, 44 (FIGS. 1, 2, 3 and 5) which form a projection within a circular groove 47 inside the cowl sections 26, 27. One end of the coiled compression spring 23 is received in this groove 47, with an interference fit over arcuate projections 43, 44 to radially locate the inner diameter of the spring 23 and to hold the casing halves together. Cowl sections 26, 27 form an axial bore 46 through the end wall 49 to allow extension of the plunger 22 outside the casing sections 11, 12.

The actuator stem also has a slot 53 transverse to its longitudinal axis for receiving a metal pin 60 (FIGS. 3 and 7) during assembly. Pin 60 is received horizontally through casing slots 61 in the casing sections 11, 12 during assembly, as seen in FIG. 3. The casing sections 11, 12 are put together and the pin 60 is then removed to allow one end of the spring to move forward over the internal arcuate projections 43, 44 formed on the opposing end of the casing sections 11, 12.

Figure 2:
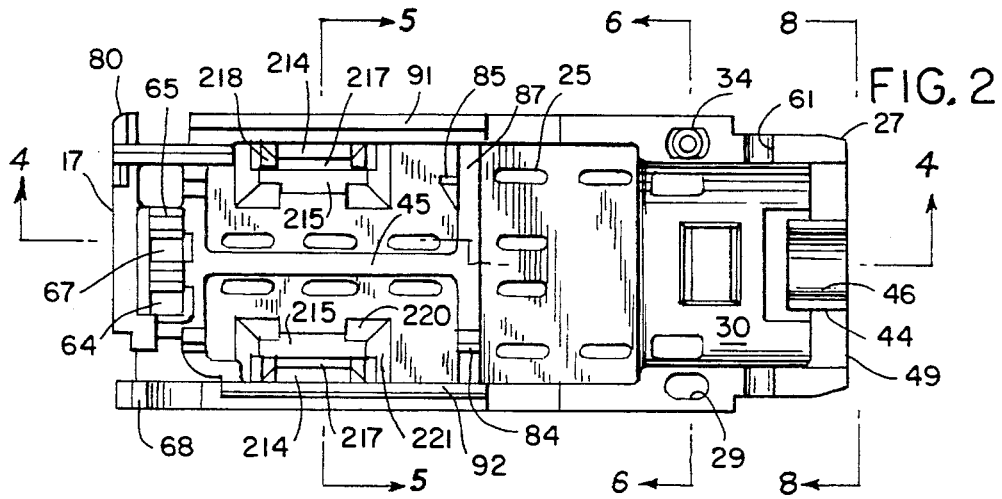
FIG. 2 ms a top plan view of bottom casing section of the actuator assembly of FIG. 1.
Figure 10:
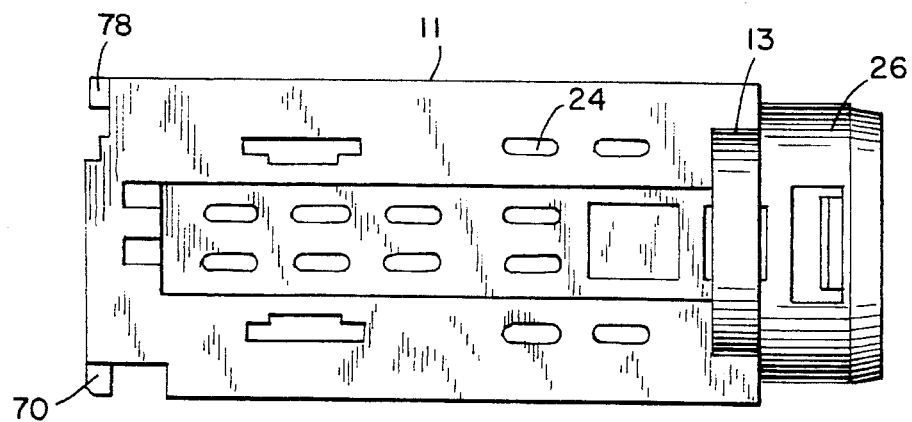
FIG. 10 is top plan view of the top casing section of FIGS. 1 and 9.

A web 45 in an H-shape, as seen from the top in FIG. 2, is positioned towards the base end wall 17 of the two sections 11, 12. A similar web (not shown) is formed on the top section 11, so that the webs will enclose the actuator body 19 and form a frame for holding the actuator body 19. Just inside the base end wall 17, the lower section 11 provides two stab connecting fingers 64, 65 (FIGS. 2, 3, 4, 6, 8) with tapered tips which fit in slots 76, 77 alternating with like fingers 74, 75 (FIG. 6) on the opposing housing section 12. Fingers 74, 75 are received in slots 66, 67 (FIG. 10). The combination of four meshed fingers 64, 65, 74, 75 forms additional support just inside the base end wall 17, and fingers 64, 65, 74, 75 are held against lateral deformation by the base end wall 17.

In addition, each casing section 11, 12 has a third stab connecting finger 68, 78 spaced from one edge of the end wall 17 and located on one corner of the casing section 11, 12. This finger 68, 78 engages a tab 70, 80 extending laterally from the base end wall 17 on an opposing corner of the other casing section 11, 12. There is a relief 69, 79 next to each third finger 68, 78 to allow the finger 68, 78 to flex as it slides around the tab 70, 80. A projection 71, 81 adjacent to the end then protects the finger 68, 78 against reversing direction around the tab 70, 80.

During assembly, spring 23 is compressed on actuator 22 and pin 60 is inserted in slot 53 to retain spring 23 in a compressed state. Housing halves 11 and 12 are assembled with pin 60 projecting through clearance slots 61, and when the pin 60 is removed, the end of the spring 23 moves forward over arcuate projections 43, 44 as seen in FIG. 1. It should be noted that the connecting members 28, 34 on opposite sides are located on opposite casing sections 11, 12, and that beams 64, 65, 74 and 75 mesh together to provide symmetrical and balanced loading across the casing joint. After the casing sections have been joined, the pin 60 is removed to allow the spring 23 to fit over projections 43, 44 and into groove 47. The end coils of the spring 23 capture and contain the arcuate portions 43, 44 of the casing sections 11, 12 to positively hold the casing sections 11, 12 together.

Along the sidewalls, there are overlapping flanges 91, 92, 93 and 94 seen in FIGS. 2, 9, 11 and 12 to provide a mating interengagement of the sidewalls along a portion of the casing joint. Member 95, seen best in FIGS. 11 and 14, encloses one corner of the housing near the base end wall 17.

Figure 12:
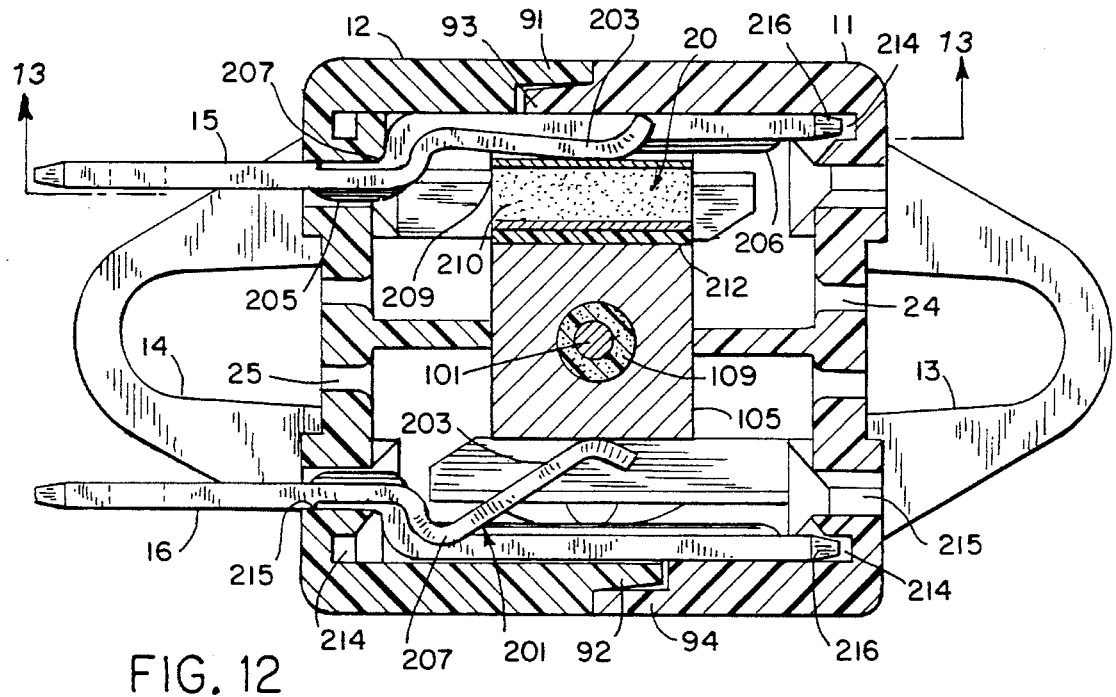
FIG. 12 is a sectional view taken in the plane indicated by line 12—12 in FIG. 11.
Figure 13:
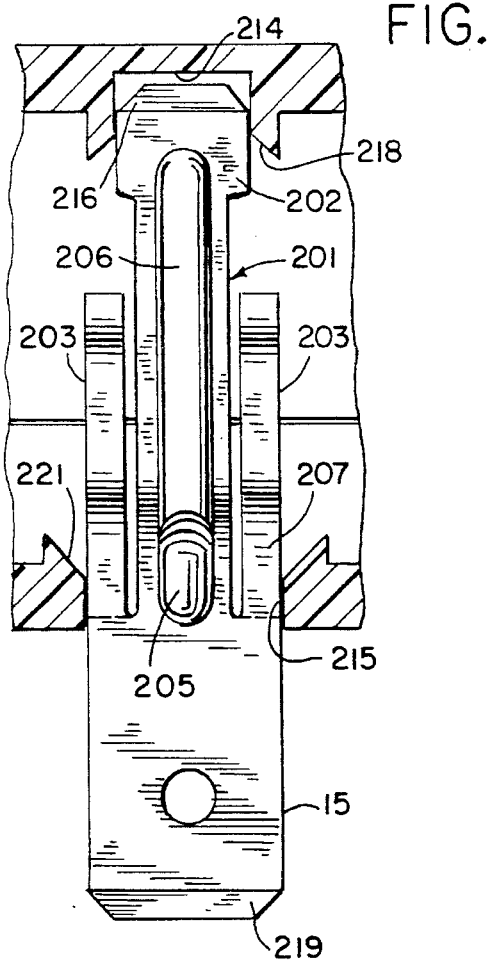
FIG. 13 is a side plan view of one of the terminals seen in FIG. 12.

Referring to FIGS. 12 and 13, terminals 201 are each provided with bifurcated, flexible leg contacts 203 to distribute the current flow onto the ohmic layer 209 of resistor 20. This improves heating response because the ohmic layers 209, 210 are of relatively low conductivity compared to the terminal 201. The bifurcated contacts 203 provide increased reliability in the event that a fracture occurs in the resistor 20 because the remaining portions would then continue to function unimpeded.

Referring to FIG. 13, each of the two terminals 201 has a conventional connection end 15, 16 and a longitudinal beam section 202 containing a longitudinal rib 206 to provide reinforcement and stiffness. The rib 206 is extended around bend section 204 as shown by reference 205 in FIG. 12. The terminal 201 is thinned at section 207 by coining or other means to permit deflection of the flexible legs 203 and to enable a resilient contact of the legs 203 against ohmic layer 209 and element case 19 as seen in FIG. 12.

Referring to FIG. 12, PTC resistor 20 is shown with conventional ohmic layers 209 and 210, shown in exaggerated thickness in the drawing. The purpose of these layers is to conduct current to the resistive element 20 to cause the heating. The efficiency of ohmic layer 209 can be improved by applying current at multiple locations from a terminal of lower resistivity than the ohmic layer 209. This is done with bifurcated terminal elements 203. Further, a fracture of the ceramic resistor 20 will be tolerated without a loss of reliability and performance by supplying power to both sides of the fracture 213.

Figure 14:
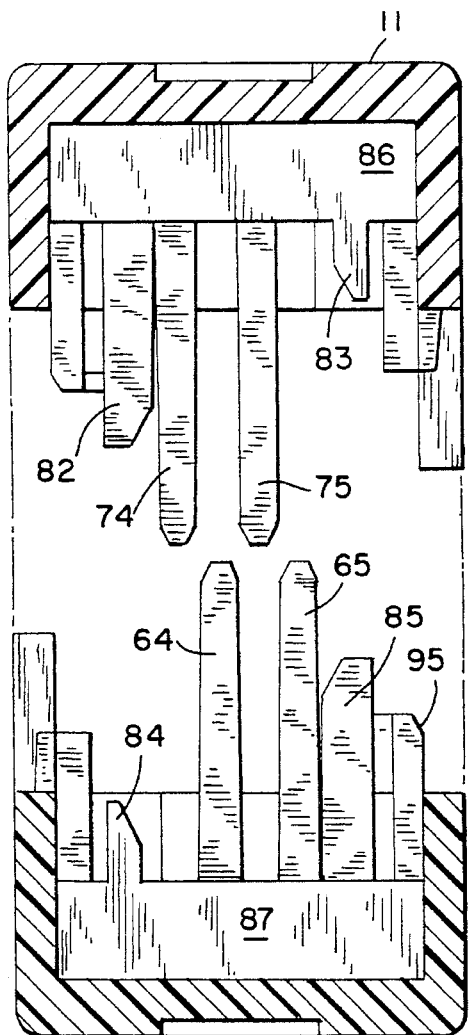
FIG. 14 is an exploded, sectional view of the assembly of FIG. 1, with the actuator removed.
Figure 15:
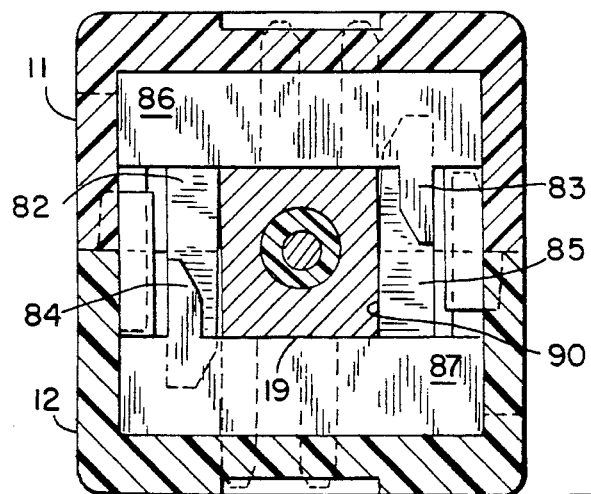
FIG. 15 is a sectional view taken in the plane indicated by line 15—15 in FIG. 1.

Referring to FIGS. 3 and 14, bulkhead sections are formed by overlapping side members 82–85 and upper and lower walls 86, 87 which form a barrier having a window 90, the barrier fitting closely around the thermal actuator housing 19 to isolate and separate the sealed end of actuator housing 19 from the PTC resistor 20. Leakage of thermally expansive material from the sealed end of housing 19, if allowed to contact resistor 20, could impair performance of the resistor 20 and cause it to overheat. The bulkhead sections prevent any leaked material from migrating back to the region of the resistor 20.

The resistor 20 is rectangular in shape to fit the sidewall of actuator housing 19. The PTC resistor 20 is attached to the housing using one of three materials, either a) a thermally conductive grease, b) a thin layer of thermally conductive adhesive that is perforated by an operating voltage of 120 volts to allow conduction between the PTC resistor and actuator housing or 3) a thermally conductive adhesive with electrically conductive particles dispersed therein. This material 212 is shown in exaggerated thickness in FIG. 12.

The thermally conductive adhesive 212 provides multiple conductive paths between the resistor 20, ohmic layer 210 and the wall of the thermal actuator housing 19. The conductive particles can also be uniformly sized to more evenly distribute the current conducted therethrough.

Referring to FIGS. 2, 12 and 13 another feature of the construction assists in correct and easy assembly of the terminals 201 in the casing sections 11 and 12. The casing sections 11 and 12 are formed with pockets 214 located between T-shaped apertures 215 for receiving the contact blades 15, 16 and respective sidewalls of the casing sections 11, 12. The upper end 216 of each terminal 201 is narrower than each contact blade 15, 16 and is laterally offset from the contact blade 15, 16. The contact blades 15, 16 are assembled by insertion from the inside of one housing section 12 used as the lower housing section, and when the upper housing section 11 is placed on top of lower housing section 12, the upper end 216 of the terminals 201 will be received and held in proper position, providing the terminals 201 are assembled with the bifurcated contacts 203 facing to the inside of the housing section 11, 12. The pockets 214 are offset from the apertures 215 to account for the offset in the terminals 201 caused by the bend at region 205.

As seen in FIG. 2, the casing sections 11, 12 each have a pair of apertures 215 for receiving the contact blades and pockets 214 disposed between respective apertures 215 and respective walls of each respective casing section 11, 12 to allow the casing sections 11, 12 to be used interchangeably in assembly with the terminals 201.

The pockets 214 include ramp surfaces 217 for selectively guiding chamfered upper ends 216 of terminals 201 into pockets 214. The pockets 214 also include ramps 218, seen best in FIG. 5, for guiding the chamfered lower ends 219 of contact blades 15, 16 away from pockets 214 and into apertures 215. Additional ramp surfaces 220, 221 are provided around T-shaped apertures 215 to guide the lower ends of contact blades 15, 16 into apertures 215.

This has been a description of examples of how the invention can be carried out. Those of ordinary skill in the art will recognize that various details may be modified in arriving at other detailed embodiments, and these embodiments will come within the scope of the invention.

Therefore, to apprise the public of the scope of the invention and the embodiments covered by the invention, the following claims are made.

We claim:

1. A casing for holding a thermally-responsive actuator with a stem that moves a plunger with substantial force against a compression spring in response to the actuator being heated, wherein the compression spring is compressed between a flange end of the plunger and a spring-bearing end wall of the casing, the casing comprising:

two longitudinally extending casing sections forming a base end wall at one end of the casing and forming a spring-bearing end wall at an opposite end of the casing, the casing sections having arcuate projections extending longitudinally from the spring-bearing end wall into an interior of the casing;

said spring-bearing end wall of the casing forming a groove adjacent the arcuate projections, said compression spring having a portion of at least one coil that is received in said groove to closely fit around the arcuate projections to hold the casing sections together.

2. The casing of claim 1, wherein the compression spring coil and the arcuate projections provide an interference fit.

3. The casing of claim 1, wherein the two longitudinal casing sections form a plurality of projections extending along the base end wall transverse to the longitudinal extension of the casing, said projections providing a plurality of simple beams when the casing sections are assembled, wherein said beams resist a reaction force applied to the thermally-responsive actuator by the compression spring upon compression and reactive force produced by output work delivered by the stem.

4. The casing of claim 1, further comprising a bulkhead section inside the casing and closely fitting around the actuator housing in a region between the operating stem and a resistor to prevent leakage of thermally expansive material from a sealed end of the actuator housing from reaching the resistor.

5. The casing of claim 1, further comprising a pair of terminals inserted through one of the casing sections transverse to the length of said casing sections, wherein each terminal has an elongated portion that bridges the joint between the casing half sections and two, bifurcated yieldable contact portions, on opposite sides of said elongated portion, for bearing against either the thermal actuator or a resistor attached to the thermal actuator.

6. The casing with terminals as recited in claim 5, wherein the elongated portion of each terminal is rib-reinforced to prevent bowing of the sidewalls of the housing.

7. The casing with terminals as recited in claim 5, wherein the terminals each have a lower portion with a contact blade formed thereon and an upper portion with an upper end that is narrower in width than said contact blade and is offset in a direction normal to said contact blade and wherein one of the casing sections has apertures for receiving the contact blades of the terminals and wherein another of the casing sections forms pockets offset from said apertures in said one of the casing sections for receiving the upper ends of the terminals to hold the terminals in proper position.

8. The casing with terminals as recited in claim 7, wherein the casing sections each have a pair of apertures for receiving the contact blades and pockets disposed between respective apertures and respective walls of each respective casing section to allow the casing sections to be used interchangeably in assembly with the terminals.

9. An actuator assembly comprising:
- a casing having a base end wall and an opposing end wall with an opening therein;
- a plunger that extends out of the opening in the opposing end wall of the housing, the plunger having a flange;
- a thermal actuator having a stem that is moved to cause axial movement of the plunger;
- a resistor mounted on the thermal actuator;
- a coiled compression spring that is held between the flange on the plunger and the opposing end of the casing, said coiled compression spring being compressed on the extension of the actuator stem, so as to provide a spring return force; and
- wherein the casing further comprises two longitudinal casing sections forming the base end wall and the opposite end wall; and
- arcuate projections formed on the opposing end wall for reception within coils of the coiled compression spring where the arcuate projections are restrained from movement in a radial direction to hold the casing sections together.

10. The assembly of claim 9, wherein the compression spring coil and the arcuate projections provide an interference fit.

11. The assembly of claim 9, wherein the two longitudinal casing sections form a plurality of projections extending along the base end wall transverse to the longitudinal extension of the casing, said projections providing a plurality of simple beams when the casing sections are assembled, wherein said beams resist a reaction force applied to the thermal actuator by the compression spring and reactive force produced by output work delivered by the stem.

12. The assembly of claim 9, further comprising a bulkhead section inside the casing and closely fitting around the actuator housing in a region between the operating stem and the resistor to prevent any leakage of thermally expansive material from a sealed end of the actuator housing from reaching the resistor.

13. The assembly of claim 9, further comprising a pair of terminals inserted through one of the casing sections transverse to the length of said casing sections, wherein each terminal has an elongated portion that bridges the joint between the casing half sections and two, bifurcated yieldable contact portions, on opposite sides of said rib-reinforced portion, for bearing against either the thermal actuator or a resistor attached to the thermal actuator.

14. The actuator assembly of claim 9, wherein the elongated portion of each terminal is rib-reinforced to prevent bowing of the sidewalls of the housing.

15. The assembly of claim 9, wherein each terminal has a reduced portion where the bifurcated yieldable contact portions join the elongated portion, said reduced portions allow flexing of the contact portions.

16. The assembly of claim 15, wherein the reduced portions are metal which is thinned by coining.

17. The assembly of claim 9, further comprising a thermally conductive adhesive with electrically conductive particles dispersed therein, said adhesive attaching said resistor to said thermal actuator to provide both thermal and electrical conductivity.

18. The assembly of claim 17, wherein the electrically conductive particles are uniform in size.

19. The assembly of claim 9, wherein the plunger has tapered web portions extending forward from the flange and extending within the coils of the compression spring, the webs having a profile that prevents the spring from buckling.

20. The assembly of claim 9, wherein the thermal actuator includes a wax motor element containing a thermally expansive wax medium housed in a rectangular actuator housing, and wherein said resistor is of a size and shape to fit approximately coextensively with the surface of said housing.

21. The assembly of claim 20 in which the resistor has a rectangular body.

22. The actuator assembly of claim 9, wherein the plunger includes a slot; and wherein the casing includes slots positioned to be aligned with the slot in the plunger; and further comprising a pin which is inserted through said plunger slot to restrain said coiled compression spring between said flange and said pin, said pin being received in said casing slots while said casing sections are being assembled, said pin being removable to allow said spring to move forward to its position holding said casing sections together.

23. A thermally responsive mechanical actuator comprising an expansive wax-like material confined within a sealed system comprising a hardened shaft, sealed to a thermally heated pressure vessel by a combination of a seal plate of softer material than the shaft cooperating with a flexible membrane tightly fitting the diameter of the shaft and an O-ring underneath supported by a shelf in said pressure vessel.

24. An actuator assembly having an assembly housing and having a thermally responsive mechanical actuator, the actuator having a stem that is moved to cause axial movement of a plunger, and the actuator comprising a rectangular actuator housing, a wax motor element containing a thermally expansive wax medium housed in said rectangular actuator housing, said actuator housing having a resistor attached thereto to heat said housing, said resistor being of the size and shape to closely approximate the surface of said assembly housing, the resistor having a rectangular body wherein the resistor abuts the rectangular actuator housing along a planer surface.

25. The casing and terminals as recited in claim 7, wherein a pocket in said casing includes a ramp for selectively guiding an upper end of one of said terminals into said pocket and ramps for guiding said lower end of one of said terminals away from said pocket and into said aperture.

26. The casing and terminals as recited in claim 7, wherein both the lower end and the upper end of one of said terminals are chamfered.

* * * * *

UNITED STATES PATENT AND TRADEMARK OFFICE
CERTIFICATE OF CORRECTION

PATENT NO. : 5,572,869
DATED : November 12, 1996
INVENTOR(S) : Spencer C. Schantz et al.

Figure 6:
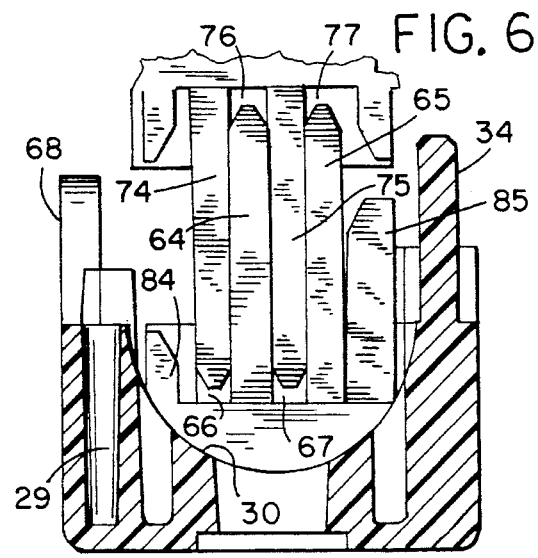
FIG. 6 ms a sectional view taken in the plane indicated by line 6—6 in FIG. 2.
Figure 7:
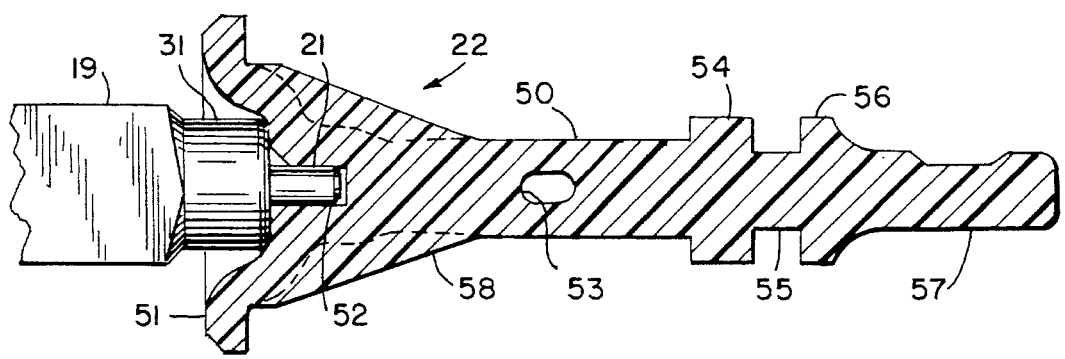
FIG. 7 ms a sectional view taken in the plane indicated by line 7—7 in FIG. 3.
Figure 8:
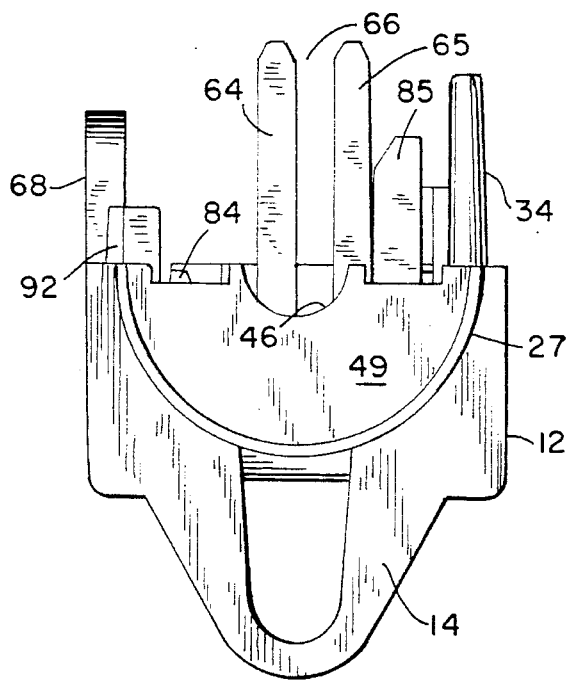
FIG. 8 ms a right end view taken in the plane indicated by line 8—8 in FIG. 2.
Figure 9:
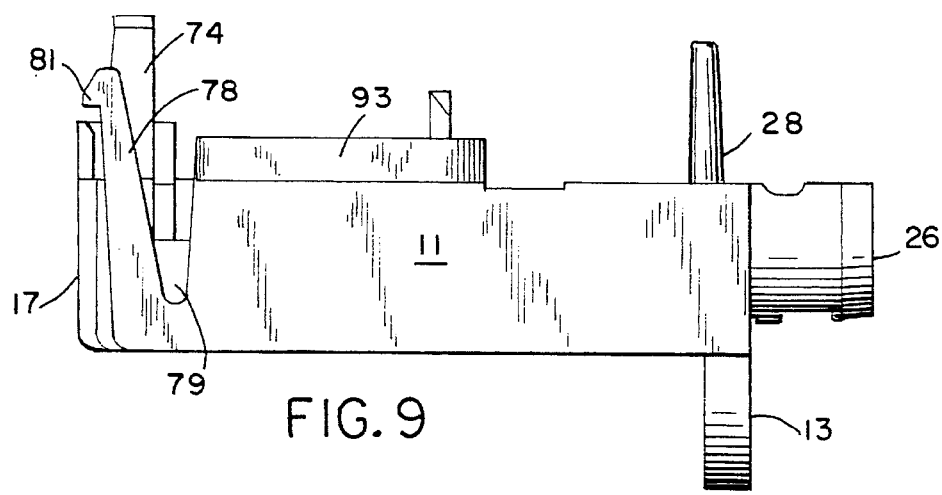
FIG. 9 ms a left side view of the top casing half section of FIG. 1 turned upside down.

It is certified that error appears in the above-indentified patent and that said Letters Patent is hereby corrected as shown below:

| | |
|---|---|
| Col. 1, line 23 | "Fig. 2 ms" should be Fig. 2 --is-- |
| Col. 1, line 25 | "Fig. 3 ms" should be Fig. 3 --is-- |
| Col. 1, line 32 | "Fig. 6 ms" should be Fig. 6 --is-- |
| Col. 1, line 34 | "Fig. 7 ms" should be Fig. 7 --is-- |
| Col. 1, line 36 | "Fig. 8 ms" should be Fig. 8 --is-- |
| Col. 1, line 38 | "Fig. 9 ms" should be Fig. 9 --is-- |
| Col. 5, line 59 | "upper end 216" should be --upper ends 216-- |

Signed and Sealed this

Twenty-fifth Day of February, 1997

Attest:

BRUCE LEHMAN

*Attesting Officer*  *Commissioner of Patents and Trademarks*